United States Patent
Lin et al.

(10) Patent No.: US 7,019,059 B2
(45) Date of Patent: Mar. 28, 2006

(54) METHOD FOR MAKING FIRE-RETARDED GLASS-FILLED POLYCARBONATE AND RELATED COMPOSITIONS

(75) Inventors: Ye-Gang Lin, Evansville, IN (US); Kapil Chandrakant Sheth, Evansville, IN (US); Rajendra Kashinath Singh, Evansville, IN (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 10/632,584

(22) Filed: Aug. 1, 2003

(65) Prior Publication Data

US 2004/0116588 A1   Jun. 17, 2004

Related U.S. Application Data

(60) Provisional application No. 60/433,740, filed on Dec. 16, 2002.

(51) Int. Cl.
*C08K 5/42* (2006.01)
*C08K 3/32* (2006.01)

(52) U.S. Cl. .................. 524/165; 524/166; 524/414; 524/417

(58) Field of Classification Search ............ 524/414, 524/417, 165–166
See application file for complete search history.

(56) References Cited

U.S. PATENT DOCUMENTS

| | | | |
|---|---|---|---|
| 3,030,331 A | 4/1962 | Goldberg | |
| 3,169,121 A | 2/1965 | Goldberg | |
| 3,775,367 A | 11/1973 | Krefeld | |
| 3,971,756 A | 7/1976 | Bialous et al. | |
| 4,028,297 A | 6/1977 | Webb | |
| 4,110,299 A | 8/1978 | Mark | |
| 4,130,530 A | 12/1978 | Mark et al. | |
| 4,130,548 A | 12/1978 | Kochanowski | |
| 4,286,083 A | 8/1981 | Kochanowski | |
| 4,303,575 A | 12/1981 | Reinert | |
| 4,335,038 A | 6/1982 | Thomas | |
| 4,552,704 A | 11/1985 | Mark | |
| 4,552,911 A | 11/1985 | Cohnen et al. | |
| 4,916,194 A | 4/1990 | Policastro et al. | |
| 5,110,840 A | 5/1992 | Blount | |
| 5,210,268 A | 5/1993 | Fukuoka et al. | |
| 5,218,027 A | 6/1993 | Smith et al. | |
| 5,326,800 A | 7/1994 | Horn et al. | |
| 5,508,323 A | 4/1996 | Romenesko et al. | |
| 5,589,530 A * | 12/1996 | Walsh ......................... | 524/152 |
| 5,606,007 A | 2/1997 | Sakashita et al. | |
| 5,608,027 A | 3/1997 | Crosby et al. | |
| 5,674,931 A * | 10/1997 | Gallagher et al. .......... | 524/414 |
| 5,973,101 A | 10/1999 | Toshida et al. | |
| 6,353,046 B1 | 3/2002 | Rosenquist et al. | |
| 6,355,767 B1 * | 3/2002 | Takagi ........................ | 528/196 |
| 6,405,759 B1 | 6/2002 | Boeye | |
| 6,462,111 B1 | 10/2002 | Singh et al. | |
| 6,512,077 B1 * | 1/2003 | Miyamoto et al. .......... | 528/196 |
| 6,518,357 B1 * | 2/2003 | Rajagopalan et al. ....... | 524/588 |
| 6,727,303 B1 * | 4/2004 | Ono et al. .................. | 524/261 |
| 6,790,887 B1 * | 9/2004 | Nishihara ................... | 524/120 |
| 2003/0004251 A1 * | 1/2003 | Hashimoto et al. ......... | 524/456 |

FOREIGN PATENT DOCUMENTS

| | | |
|---|---|---|
| EP | 0 283 654 A1 | 9/1988 |
| EP | 0 846 729 A2 | 6/1998 |
| EP | 0 899 303 A2 | 3/1999 |
| WO | WO 02/28970 A1 | 4/2002 |

OTHER PUBLICATIONS

PCT International Search Report for International Application No. PCT/US 30/38974, International filing date Dec. 5, 2003.

* cited by examiner

*Primary Examiner*—Peter Szekely

(57) ABSTRACT

It has now been surprisingly found that addition of a phosphorous-containing oxy acid to a glass-filled polycarbonate composition substantially improves its fire retardant performance. Thus, the present invention provides a method for making a flame-retarded glass-filled polycarbonate resin comprising adding to the resin an effective flame-retardant amount of a phosphorous-containing oxy acid. Where appropriate, the melt strength of the polycarbonate is enhanced by the addition of an antidrip agent and the performance can be further enhanced by the addition of a flame retardant. Use of such a composition results in superior fire-retardant performance.

15 Claims, No Drawings

METHOD FOR MAKING FIRE-RETARDED GLASS-FILLED POLYCARBONATE AND RELATED COMPOSITIONS

This application claims rights of priority from U.S. Provisional Patent Application Ser. No. 60/433,740, filed Dec. 16, 2002, which is hereby incorporated by reference.

BACKGROUND OF INVENTION

This application relates to a method for imparting fire-retardant properties to glass-filled polycarbonate resins, to compositions useful in the method, and to fire-retarded polycarbonate resins of the type produced by the method.

Because of their strength, glass-filled polycarbonate resins have a great many significant commercial applications. They are especially useful for injection molding of thin walled parts. Unfortunately, glass-filled polycarbonate resins are inherently flammable and can drip hot molten material causing nearby materials to catch fire as well. Thus, in order to safely utilize glass-filled polycarbonates in many applications it is necessary to include additives which retard the flammability of the material and/or which reduce dripping. The challenge is to identify additives which accomplish this purpose without compromising the desirable strength properties, without introducing new problems (such as the potential environmental problems associated with some halogenated additives) and without prohibitively increasing the price.

A variety of different materials have been described for use in producing fire-retarded and/or drip-resistant polycarbonate compositions. Exemplary of these are the materials described in U.S. Pat. Nos. 3,971,756, 4,028,297, 4,110,299, 4,130,530 4,303,575, 4,335,038, 4,552,911, 4,916,194, 5,218,027 and 5,508,323. Notwithstanding these varied disclosures, however, there remains room for improvement in the formulation of fire-retarded glass-filled polycarbonate resin compositions.

Among the additives which are widely used commercially in fire-retarded polycarbonate resin compositions are organic salts, particularly sulfonic acid salts. Particular examples of these salts are perfluoroalkane sulfonates, such as potassium perfluorobutane sulfonate ("KPFBS", also known as "Rimar salt") and potassium diphenylsulfone sulfonate ("KSS"). The use of perfluoroalkane sulfonates in polycarbonate resins is described in U.S. Pat. No. 3,775,367. However, the benefits which can be obtained using these materials alone with glass-filled polycarbonate resins are limited and indeed additional additives are generally included. The conventional means for enhancing the fire-retardant properties of these types of compositions has been the addition of soluble organic halogen additives. However, the halogenated additives are unsuitable for compositions that are required to meet certain newer "ECO-friendly" standards.

SUMMARY OF INVENTION

It has now been surprisingly found that addition of a phosphorous-containing oxy acid to a glass-filled polycarbonate composition substantially improves its fire retardant performance. Thus, the present invention provides a method for making a flame-retarded glass-filled polycarbonate resin comprising adding to the resin an effective flame-retardant amount of a phosphorous-containing oxy acid. Where appropriate, the melt strength of the polycarbonate is enhanced by the addition of an antidrip agent and the performance can be further enhanced by the addition of one or more flame retardants. Use of such a composition results in superior fire-retardant performance.

DETAILED DESCRIPTION

The present invention provides a method for making a flame-retarded glass-filled polycarbonate resin by adding an effective amount of a phosphorous-containing oxy acid to a glass-filled polycarbonate resin. In a further aspect, the present invention provides a glass-filled polycarbonate resin composition with flame-retarded properties. The composition comprises a polycarbonate resin and an effective flame-retardant amount of a phosphorous-containing oxy acid. In still a further aspect, the invention provides a flame-retardant glass-filled polycarbonate composition further comprising a flame retardant agent and an anti-drip agent. In yet another aspect, the present invention provides an article comprising the composition wherein said article has a 90% or greater chance of initially passing the Underwriter Laboratories Standard UL94 test, which is incorporated herein by reference.

The polycarbonate resin used in the method and composition of the invention may be of any grade and made by any method. Thus, for example, the polycarbonate may be made via interfacial processes or by melt process (catalytic transesterification). The polycarbonate may be either branched or linear in structure, and may include functional substituents. Polycarbonate copolymers are also included within the invention and the term "polycarbonate" should be interpreted as inclusive of copolymers and blends with other thermoplastics. Techniques for manufacture of polycarbonates by these processes are well known, for example from U.S. Pat. Nos. 3,030,331, 3,169,121, 4,130,548, 4,286,083, 4,552,704, 5,210,268 and 5,606,007. A combination of two or more polycarbonates of differing molecular weights is often used.

The glass fibers used for the present invention are well known to those skilled in the art and are widely available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 0.00012 to about 0.00075 inch, but this not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur Glass fibers useful in the invention may be treated with chemical coatings called "sizing" agents. Sizing agents may be applied to glass fiber as described, for example, in U.S.

Pat. No. 6,405,759. Examples of some sizing agents include film-forming polymeric materials (e.g., low molecular weight epoxy emulsions), organosilane coupling or keying agents, cationic or nonionic lubricants, processing aids, silanes, organofunctional silanes (e.g., 3-glycidoxypropylt- rimethoxy silane, 3-aminopropyltriethoxysilane and 3-meth- acryloxypropyltrimethoxysilane, cross-linking agents (e.g., bis-silane and antioxidants).

Flame retardants may also be added to the composition. Useful fire retardants are free of chloride and bromide. Typically this includes alkali and alkali metal salts of the following compounds that perform as fire retardants in polycarbonate compositions: monomeric or polymeric aromatic sulfonic acids; monomeric or polymeric aromatic sulfonesulfonic acids; sulfonic acids of aromatic ketones, heterocyclic sulfonic acids; fluorinated methanesulfonic acids; fluorinated non-aromatic carboxylic acids; sulfonic acids of aromatic sulfides; monomeric or polymeric aromatic ether sulfonic acids; aliphatic and olefinic sulfonic acids; unsubstituted or fluorinated oxocarbon acids; sulfonic acids of monomeric and polymeric aromatic carboxylic acids and esters; fluorocycloaliphatic aromatic sulfonic acids; monomeric or polymeric aromatic amide sulfonic acids; and mixtures comprising at least one of the foregoing alkali or alkali metal salts. A more preferred flame retardant is a perfluoroalkane sulfonate salt, such as an alkali metal salt (e.g., potassium). Specific, non-limiting examples of suitable sulfonic acid salts are perfluoroalkane sulfonate alkali metal, $C_1$–$C_6$ alkylammonium, or ammonium salts. Such salts are described in the above-mentioned U.S. Pat. No. 3,775,367, and include, for example, salts such as sodium, potassium, or tetraethyl ammonium perfluoromethylbutane sulphonate; sodium, potassium, or tetraethyl ammonium perfluoromethane sulphonate; sodium, potassium, or tetraethyl ammonium perfluoroethane sulphonate; sodium, potassium, or tetraethyl ammonium perfluoropropane sulphonate; sodium, potassium, or tetraethyl ammonium perfluorohexane sulphonate; sodium, potassium, or tetraethyl ammonium perfluoroheptane sulphonate; sodium, potassium, or tetraethyl ammonium perfluoroctanesulphonate; sodium, potassium, or tetraethyl ammonium perfluorobutane sulfonate; and sodium, potassium, or tetraethyl ammonium diphenylsulfon-3-sulphonate; and mixtures comprising at least one of the foregoing salts. Potassium perfluorobutane sulfonate (KPFBS) and potassium diphenylsulfon-3-sulphonate (KSS) are particularly preferred. These sulfonate salts may also be used in combination with salts of toluene sulfonic acid (e.g., the sodium salt).

In the method and polycarbonate-containing compositions of the invention, the amount of potassium salt of perfluoroalkane sulfonate is suitably low to minimize cost, for example in the range of 0.004 to 0.05 weight %, more preferably from 0.008 to 0.03 weight %. The amount of the sodium salt of the toluene sulfonic acid is suitably from 0.001 to 0.1 weight %, more preferably from 0.005 to 0.05 weight %. Particularly preferred are combinations of at least 0.009 weight % of the potassium metal salt of perfluoroalkane sulfonate and at least 0.005 weight % of the sodium salt of the toluene sulfonic acid, for example 0.001 to 0.05% of the potassium salt of the perfluoroalkane sulfonate and 0.005 to 0.2% sodium salt of the toluene sulfonic acid.

The fire-retarded polycarbonate resins of the invention may also include an antidrip agent. As used in the specification and claims of this application, the term "antidrip" refers to an additive which increases the melt strength of the polycarbonate, thereby reducing the tendency of the resin, when heated to close to melting, to drip. Examples of suitable antidrip agents include PTFE-based antidrip agents, such as 1/1 dispersion of PTFE in styrene acrylonitrile resin, emulsion based PTFE, and steam-precipitated PTFE. The antidrip agent is added in an amount effective to increase the melt strength and reduce drip, for example in the range of from 0.05 to 0.5 weight %. Polytetrafluoroethylene resin is well known in the art. Polytetrafluoroethylene resin is typically a finely-divided solid that, when exposed to mechanical shear, has the ability to form ultrafine fibrils. Polytetrafluoroethylene is commercially available, typically as an aqueous suspension. It is preferable for ease of dispersion that the polytetrafluoroethylene resin particles be pre-dispersed in a resin matrix such as a thermoplastic resin for example, styrene-acrylonitrile as taught in European Patent Application No. 899 303. The encapsulated polytetrafluoroethylene resin particles typically have a particle size of about 35 to about 70 micrometers with about 40 to about 65 micrometers preferred. The polytetrafluoroethylene resin is typically employed in amounts less than about 0.1 weight percent (wt %), preferably less than or equal to about 0.075 wt %, and most preferably less than or equal to about 0.05 wt %, each based on the total weight of the polycarbonate. The fluorinated polyolefin must be employed in amounts effective to prevent dripping of the composition during heating, typically greater than or equal to about 0.025 wt %.

The instant invention further comprises a phosphorous containing oxy-acid. More preferably the acid will include one of the following: phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid.

The phosphorous containing oxy-acid is preferably:
(1) a multi-protic phosphorus containing oxy-acid having the general formula:

$$H_m P_t O_n$$

where m and n are each 2 or greater and t is 1 or greater; or (2) a tri-ester of a multi-protic phosphorus containing acid having the general formula:

$$(R_1O)(R_2O)(R_3O)H_x P_y O_{z-3}$$

where x, may be zero or a positive integer and z may be 3 or greater, y is 1 or greater,; and $R_1$, $R_2$, and $R_3$, are organic radicals. An effective, flame-retardant amount of the phosphorous-containing oxy acid is one that increases the flame-resistant properties of the glass-filled polycarbonate, as compared to an otherwise identical composition without the flame retardant.

While the specific method for testing for flame-retardant properties is not critical, one common method that may be employed involves the formation of bars molded from extruded polycarbonate and tested using the standard Underwriters Laboratory UL 94 test method, which is incorporated herein by reference. The data may be analyzed by calculation of the average flame out time (avFOTsec), standard deviation of the flame out time (sdFOTsec) and the total number of drips, and using statistical methods to convert that data to a prediction of the probability of first time pass, or "p(FTP)" that a particular sample formulation would achieve a V0 "pass" rating in the conventional UL94 testing of 5 bar.s Preferably p(FTP) will be as close to 1 as possible, for example greater than 0.9 and more preferably greater than 0.95, for maximum flame-retardant performance in UL Testing.

Other additives which are conventional in the art may also be added to the polycarbonate resin in the method and compositions of the invention. Such additives include, but are not limited to, stabilizers, mold release agents, light stabilizers, heat stabilizers, pigments, dyes, and fillers.

In one specific embodiment, glass-filled polycarbonate resin in accordance with the invention may contain a fire-retardant comprising a potassium salt of a perfluoroalkane sulfonate and optionally, a sodium salt of toluene sulfonic acid. This glass-filled polycarbonate is particularly suitable for making thin walled articles, for examples articles having a wall thickness of less than 1.5 mm, i.e., 1 mm to 1.5 mm, because of its ability to achieve good fire-retardance even for thin pieces of material. These articles may be formed by injection molding, extrusion, or blow molding.

In some typical compositions according to the invention the composition contains less than 0.7 phr flame retardant and less than 0.00009 phr phosphorous acid.

The invention will now be further described with reference to the following non-limiting examples.

EXAMPLE 1

A set of experiments was performed using three different formulations of polycarbonate with different loadings of Rimar salt. The data in Table 1 indicate that the loading of Rimar salt should be less than 0.07 phr. In the context of this application, "phr" is an abbreviation for "parts hundred resin." This term is a weight measurement where the parts of polycarbonate are taken to represent 100 parts and each additional ingredient is compared on a weight basis to the total weight of the polycarbonate. For example, if 100 grams of polycarbonate were used, 1 gram of an additional ingredient blended in would be considered to be 1 phr. The values in all of the tables herein are given in phr. (Resin is in %)

TABLE 1

|  | Batch 1 | Batch 2 | Batch 3 |
| --- | --- | --- | --- |
| High Flow PC | 45 | 45 | 45 |
| 100 Grade PC | 55 | 55 | 55 |
| Glass Fiber | 10.25 | 10.25 | 10.25 |
| Mold Release | 0.27 | 0.27 | 0.27 |
| Heat Stabilizer | 0.06 | 0.06 | 0.06 |
| Antidrip | 0.15 | 0.15 | 0.15 |
| Rimar | 0.05 | 0.06 | 0.07 |
| p(FTP) @ 62 mils | 0.73 | 0.48 | Dripped |

The Dripping behavior observed for Batch 3 above suggests that the loading of Rimar salt in the formulation should be <0.07 phr. In table I, High Flow PC means bisphenol-A polycarbonate homopolymer having a molecular weight of about 21,600 to 22,200 (molecular weights are based on Gel Permeation chromatography measurements using polycarbonate standards), 100 Grade PC means bisphenol-A polycarbonate homopolymer having a molecular weight of about 29,500 to 30,300, glass fiber means Owens Corning CRATEC brand dry chopped strand fiber grade 415A (non-bonding grade with a silane sizing) (4 mm length), the mold release was pentaethyritol tetrastearate, the heat stabilizer was IRGAPHOS 168 (tris(2,4-di-t-butylphenyl)phosphite), the antidrip agent was polytetrafluoroethylene (PTFE) prepared as 1/1 dispersion of PTFE in styrene acrylonitrile resin emulsion as described above, and the Rimar salt was a perfluorobutane sulfonate potassium salt.

Flammability testing was conducted using the statistical "UL Tool" in which 20 bars, at the specified thickness, rather than the usual 5 bars, are burned using the UL94 test protocol and the average flame-out times and Standard Deviation (SD) of the flame-out times are calculated and subsequently converted to a numerical estimate of the probability of a first time pass "p[FTP]" value as reported in the tables instead of the simple and less informative pass/fail criteria in UL94 testing.

EXAMPLE 2

A set of experiments was performed using two different formulations of polycarbonate with different relative loadings of polycarbonate. The results are given in Table 2. The same experiments were repeated and the results are summarized in Table 3. The results are inconsistent, so it is difficult to make conclusions from these experiments. The ingredients used were the same as described in Example 1.

TABLE 2

|  | Batch 1 | Batch 2 |
| --- | --- | --- |
| High Flow PC | 35 | 40 |
| 100 Grade PC | 65 | 60 |
| Glass Fiber | 10.25 | 10.25 |
| Mold Release | 0.27 | 0.27 |
| Heat Stabilizer | 0.06 | 0.06 |
| Antidrip | 0.15 | 0.15 |
| Rimar | 0.055 | 0.055 |
| p(FTP) @ 62 mils | 0.79 | 0.94 |

TABLE 3

|  | Batch 1 | Batch 2 |
| --- | --- | --- |
| High Flow PC | 35 | 40 |
| 100 Grade PC | 65 | 60 |
| Glass Fiber | 10.25 | 10.25 |
| Mold Release | 0.27 | 0.27 |
| Heat Stabilizer | 0.06 | 0.06 |
| Antidrip | 0.15 | 0.15 |
| Rimar | 0.055 | 0.055 |
| p(FTP) @ 62 mils | 0.97 | 0.7 |

EXAMPLE 3

A set of experiments was performed for several different formulations comprising the Antidrip agent and the Rimar salt flame retardant as described above. The results are given in Table 4. The ingredients used were the same as described in Example 1, with the exception of the phosphorous acid. The phosphorous acid solution was prepared as follows, 1 gram of 45 weight percent aqueous solution was diluted with 99 grams of deionized water. The values for phr of the phosphorous acid reported above in Table 4 correspond to the entire weight of the diluted solution. The data in Table 4 shows that addition of a relatively low amount of diluted aqueous phosphorous acid results in consistent improved flame retardance. Flame retardance performance values of above 0.9 are considered acceptable.

TABLE 4

|  | Batch 1 | Batch 2 | Batch 3 | Batch 4 | Batch 5 | Batch 6 |
|---|---|---|---|---|---|---|
| High Flow PC | 40 | 40 | 40 | 40 | 40 | 40 |
| 100 Grade PC | 60 | 60 | 60 | 60 | 60 | 60 |
| Glass Fiber | 10.25 | 10.25 | 10.25 | 10.25 | 10.25 | 10.25 |
| Mold Release | 0.27 | 0.27 | 0.27 | 0.27 | 0.27 | 0.27 |
| Heat Stabilizer | 0.06 | 0.06 | 0.06 | 0.06 | 0.06 | 0.06 |
| Antidrip | 0.15 | 0.15 | 0.15 | 0.15 | 0.15 | 0.15 |
| Rimar | 0.055 | 0.055 | 0.055 | 0.055 | 0.055 | 0.055 |
| Phosphorous Acid |  | 0.02 | 0.04 | 0.06 | 0.08 | 0.1 |
| p(FTP) @ 62 mils | 0.88 | 0.96 | 0.93 | 0.96 | 0.92 | 0.98 |

EXAMPLE 4

A set of experiments was performed for several different formulations comprising the Antidrip agent and the Rimar salt flame retardant as described above, but a second flame retardant (i.e., sodium tosylate) was also added. In Table 5, "NaTS" means sodium tosylate. Otherwise, the ingredients used were the same as described and reported in the previous examples. The data in Table 5 suggests that the optimal loading of phosphorous acid solution is 0.0963 phr, and that loadings above about 0.2 can adversely effect flame performance in this formulation.

TABLE 5

|  | Batch 1 | Batch 2 | Batch 3 | Batch 4 | Batch 5 | Batch 6 | Batch 7 |
|---|---|---|---|---|---|---|---|
| High Flow PC | 35 | 35 | 35 | 35 | 35 | 35 | 35 |
| 100 Grade PC | 65 | 65 | 65 | 65 | 65 | 65 | 65 |
| Glass Fiber | 10.25 | 10.25 | 10.25 | 10.25 | 10.25 | 10.25 | 10.25 |
| Mold Release | 0.27 | 0.27 | 0.27 | 0.27 | 0.27 | 0.27 | 0.27 |
| Heat Stabilizer | 0.05 | 0.05 | 0.05 | 0.05 | 0.05 | 0.05 | 0.05 |
| Antidrip | 0.16 | 0.16 | 0.16 | 0.16 | 0.16 | 0.16 | 0.16 |
| Rimar | 0.015 | 0.015 | 0.015 | 0.015 | 0.015 | 0.015 | 0.015 |
| NaTS | 0.015 | 0.015 | 0.015 | 0.015 | 0.015 | 0.015 | 0.015 |
| Phosphorous Acid |  | 0.0275 | 0.055 | 0.0963 | 0.1375 | 0.29 | 0.75 |
| p(FTP) @ 62 mils | 0.477 | 0.902 | 0.953 | 0.992 | 0.962 | 0.387 | 0.277 |

Although the present invention has been described in considerable detail with reference to certain preferred versions thereof, other versions are possible. Therefore, the spirit and scope of the appended claims should not be limited to the description of the preferred versions contained herein.

What is claimed is:

1. A composition comprising:
   a) a first polycarbonate,
   b) a plurality of glass filaments
   c) a flame retardant,
   d) an anti-drip agent, and
   e) an effective flame-retardant amount of a phosphorous-containing oxy acid,
wherein the composition comprises less than 0.07 phr flame retardant and the flame retardant is a perfluoroalkane sulfonate salt.

2. The composition according to claim 1 which further comprises a second polycarbonate having a molecular weight different from the first polycarbonate.

3. The composition according to claim 1, wherein the flame retardant has an alkali metal cation.

4. The composition according to claim 1, wherein the anti-drip agent is tetrafluoroethylene (PTFE).

5. The composition according to claim 1, wherein the phosphorous-containing oxy acid is selected from the group consisting of phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid and fluorohypophosphoric acid.

6. The composition according to claim 1, wherein the phosphorous-containing oxy acid is phosphorous acid, and the composition comprises less than 0.2 phr phosphorous acid.

7. The composition according to claim 1, wherein the anti-drip agent is tetrafluoroethylene (PTFE) and the phosphorous-containing oxy acid is phosphorous acid, wherein the composition comprises less than 0.2 phr phosphorous acid.

8. An article comprising the composition according to claim 1, wherein said article complies with the V0 rating of Underwriter Laboratories Standard UL94.

9. A composition consisting essentially of:
   a) one or more polycarbonates,
   b) a plurality of glass filaments,
   c) a flame retardant,
   d) an anti-drip agent,
   e) an effective flame-retardant amount of a phosphorous-containing oxy acid, and
   a mold release agent, and
   g) optionally a colorant or pigments,
wherein the composition comprises less than 0.07 phr flame retardant and the flame retardant is a perfluoroalkane sulfonate salt.

10. An article comprising the composition according to claim 9, wherein said article complies with the V0 rating of Underwriter Laboratories Standard UL94.

11. The composition according to claim 9 which further comprises a second polycarbonate having a molecular weight different from the first polycarbonate.

12. The composition according to claim 9, wherein the anti-drip agent is tetrafluoroethylene (PTFE).

13. The composition according to claim 9, wherein the phosphorous-containing oxy acid is selected from the group consisting of phosphoric acid, phosphorous acid, hypophosphorous acid, hypophosphoric acid, phosphinic acid, phosphonic acid, metaphosphoric acid, hexmetaphosphoric acid, thiophosphoric acid, fluorophosphoric acid, difluorophosphoric acid, fluorophosphorous acid, difluorophosphorous acid, fluorohypophosphorous acid and fluorohypophosphoric acid.

14. The composition according to claim 9, wherein the phosphorous-containing oxy acid is phosphorous acid, and the composition comprises less than 0.2 phr phosphorous acid.

15. The composition according to claim 9, wherein the anti-drip agent is tetrafluoroethylene (PTFE) and the phosphorous-containing oxy acid is phosphorous acid, wherein the composition comprises less than 0.2 phr phosphorous acid.

* * * * *